United States Patent [19]
Harada

[11] Patent Number: 5,210,569
[45] Date of Patent: May 11, 1993

[54] CAMERA HAVING A DISPLAY WHICH VARIES ACCORDING TO AN EXPOSURE CONTROL MODE

[75] Inventor: Yoshihito Harada, Kanagawa, Japan

[73] Assignee: Canon Kabushiki Kaisha, Tokyo, Japan

[21] Appl. No.: 735,799

[22] Filed: Jul. 25, 1991

[30] Foreign Application Priority Data

Jul. 27, 1990 [JP] Japan ................... 2-199779

[51] Int. Cl.⁵ .............................................. G03B 17/18
[52] U.S. Cl. .................................. 354/442; 354/474; 354/289.1
[58] Field of Search ............... 354/441, 442, 471, 472, 354/474, 475, 289.1, 289.12

[56] References Cited

U.S. PATENT DOCUMENTS

| | | | |
|---|---|---|---|
| 4,168,892 | 9/1979 | Ueda et al. | 354/442 |
| 4,629,305 | 12/1986 | Sato et al. | 354/442 |
| 4,847,651 | 7/1989 | Izumi et al. | 354/471 |
| 4,947,203 | 8/1990 | Taniguchi et al. | 354/475 |

Primary Examiner—W. B. Perkey
Attorney, Agent, or Firm—Fitzpatrick, Cella, Harper & Scinto

[57] ABSTRACT

A camera includes an exposure control part which permits exposure control either in a first exposure control mode or in a second exposure control mode, a selection member which is movable and is arranged to permit selection of the first exposure control mode or the second exposure control mode on the basis of each position to which the selection member is moved, and a display part which is arranged to change over contents of a display according to the moving position of the selection member. The display part is arranged to display exposure control information when the first exposure control mode is selected and not to display the exposure control information when the second exposure control mode is selected.

35 Claims, 7 Drawing Sheets

FIG.5(a)

| | WHEN SW1 IS OFF | | | | | WHEN SW1 IS ON | | | | |
|---|---|---|---|---|---|---|---|---|---|---|
| | FLM | TV SV | AV | SCL | CMP | FLM | TV SV | AV | SCL | CMP |
| ISO | × | O | × | × | × | × | O | × | × | × |
| M | O | × | O | × | × | O | O | O | O | ΔEV |
| AV | O | O | O | O | O | O | O | O | O | O |
| TV | O | × | × | O | O | O | O | O | O | O |
| PROGRAM | O | × | × | × | O | O | O | O | O | O |
| LOCK | × | × | × | × | × | × | × | × | × | × |
| AUTO | O | × | × | × | × | O | O | O | × | × |
| PORTRAIT | O | × | × | × | × | O | O | O | × | × |
| SPORT | O | × | × | × | × | O | O | O | × | × |

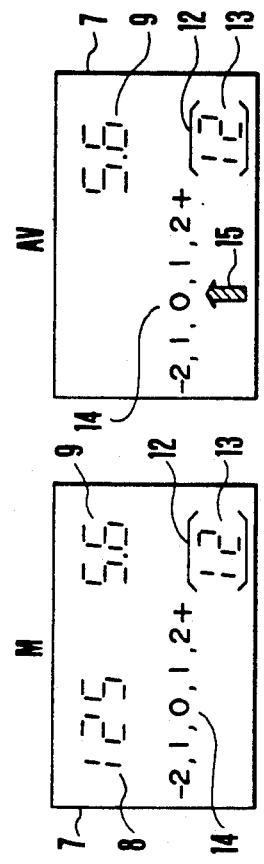
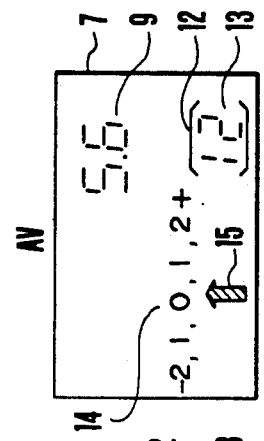
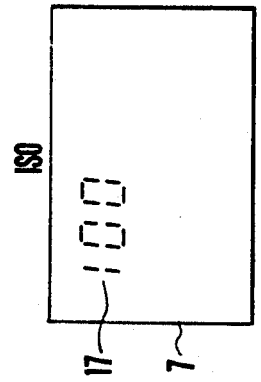
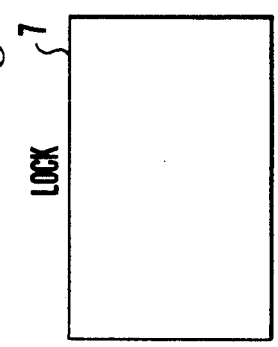
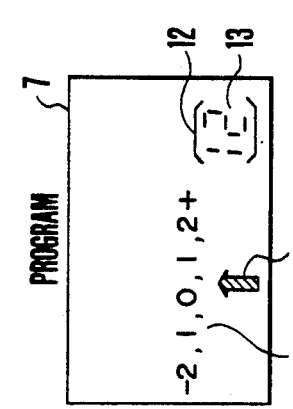
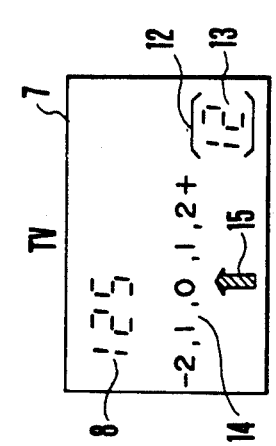
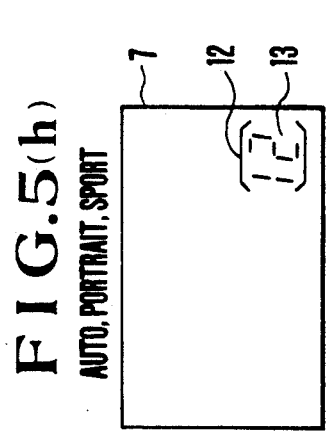

CAMERA HAVING A DISPLAY WHICH VARIES ACCORDING TO AN EXPOSURE CONTROL MODE

BACKGROUND OF THE INVENTION

1. Field of the Invention

This invention relates to a camera having a mode selection means and a display means.

2. Description of the Related Art

Full automatic single-lens reflex cameras on the market these days are arranged to be much easier to operate than cameras of the old manual operating type. These new cameras have come to enable the people referred to as "high amateurs" to take such photographs as were possible only professional cameramen in the past. As a result, the number of people using the single-lens reflex camera has increased of late, including even those who do not possess little knowledge of cameras.

However, for the people having little knowledge of cameras, even a highly automated single-lens reflex camera is still difficult to handle and is desired to be further improvements in operability are desired.

Some of the single-lens reflex cameras which have recently been improved are provided with exposure control mode selection dials which permit the camera operators to select and set one of various exposure control modes as desired by turning the dial. However, symbols or letters marked on the surface of the dial are the capital letters of technical terms relative to cameras. The technological matters imported by such symbols or letters are comprehensible only by people having a certain amount of knowledge of cameras. Therefore, the people who do not know little about cameras or are unaccustomed to the use of single-lens reflex cameras have not been enabled by the provision of the above-stated dial to adequately utilize the performance capability of the camera.

Further, the results of research recently conducted have revealed the following: A relatively large number of users are not satisfied by the uncomprehensibleness of the exposure compensating operation and the indications provided on the camera for the operation. Meanwhile, it has become apparent that the exposure compensating operation is unnecessary for camera users who know little about cameras, because the meaning of exposure compensation is not sufficiently understood by them. Accordingly, the indications relative to the exposure compensation are not necessary for these people.

Further, in the above-stated automatic single-lens reflex camera, information on the exposure control mode selected by means of the dial is arranged to be displayed on the image plane of an external display device provided on the upper surface of the camera. However, since the information is not shown on the image plane of a viewfinder, the camera operator must move his or her eye temporarily away from the viewfinder in confirming the exposure information prior to a shutter release. This arrangement has put the camera operator to inconvenience.

SUMMARY OF THE INVENTION

It is one aspect of this invention to provide a camera wherein a first exposure control mode or a second exposure control mode is arranged to be selectable by operating and moving a selection member; and exposure control values to be used in the mode selected are arranged to be displayed by a display means when the first exposure control mode is selected and to be not displayed by the display means when the second exposure control mode is selected. The exposure control values are thus arranged to be displayed or not displayed as desired according to the nature of the exposure control mode selected, so that the camera can be easily operated by any of camera operators including even a beginner camera operator as well as a highly skilled operator.

It is another aspect of the invention to provide a camera wherein a first group of exposure control modes which are suited for persons having a certain degree of knowledge of cameras and a second group of exposure control modes which are suited for persons who do not know much about cameras are arranged to be displayed separately from each other on the surface of an exposure control mode selection dial, so that the camera can be operated without difficulty even by a beginner camera operator; information on any exposure control mode that is selected by operating the dial is arranged to be displayed not only on an external display device but also on the image plane of a viewfinder to enable the camera operator to confirm exposure information without parting his or her eye from the image plane of the viewfinder after commencement of a photograph taking operation; and, in cases where a person who does not know little about cameras selects the second exposure control mode by operating the above-stated dial, an exposure compensation scale is not displayed on the external display device nor on the image plane of the viewfinder on the assumption that no exposure compensating operation is to be performed.

The above and other aspects and features of the the invention will become apparent from the following detailed description of an embodiment thereof taken in conjunction with the accompanying drawings.

BRIEF DESCRIPTION OF THE DRAWINGS

FIGS. 4(a) and 4(b) show the main routine of the control actions and FIG. 4(c) shows a subroutine.

FIG. 5(a) shows exposure modes selectable by the main dial of the same camera as in correlation with various displays to be made on an external display device and the image plane of the viewfinder.

FIGS. 5(b) to 5(h) show by way of example several of the different displays shown in FIG. 5(a).

DETAILED DESCRIPTION OF THE PREFERRED EMBODIMENT

Figure 1:
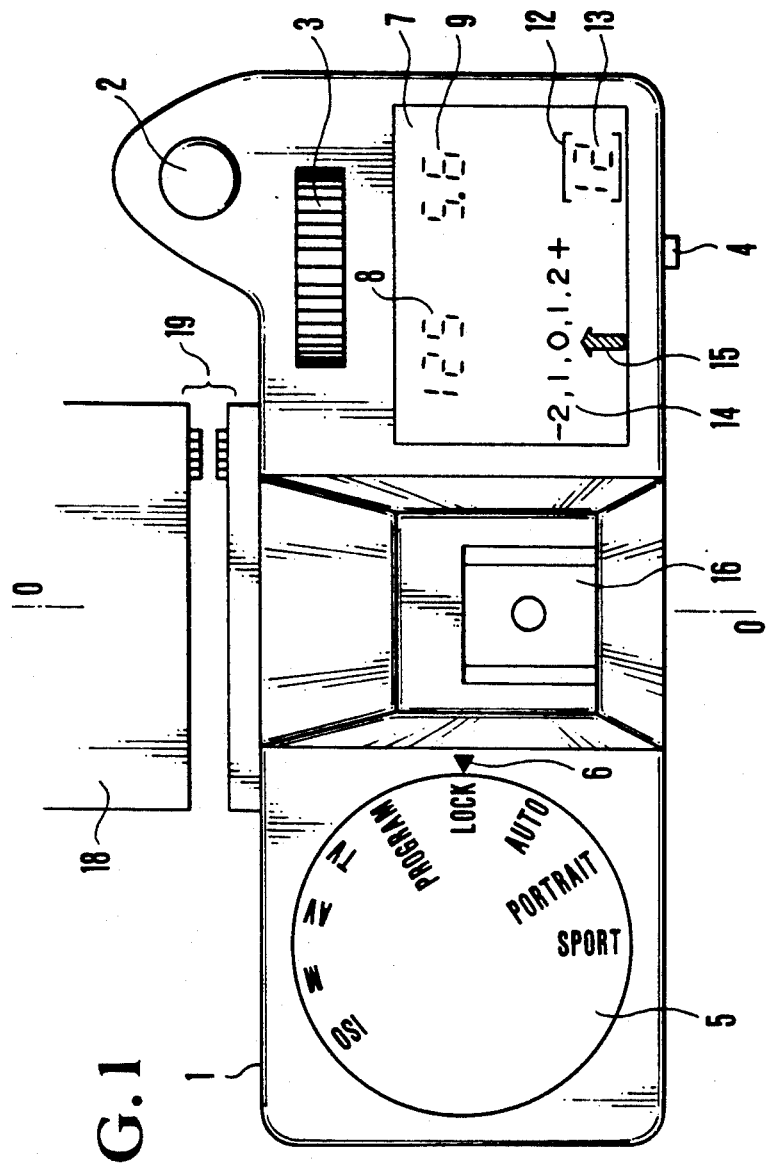
FIG. 1 is a top view showing in outline the upper surface of a camera arranged according to this invention as an embodiment thereof.
Figure 2:
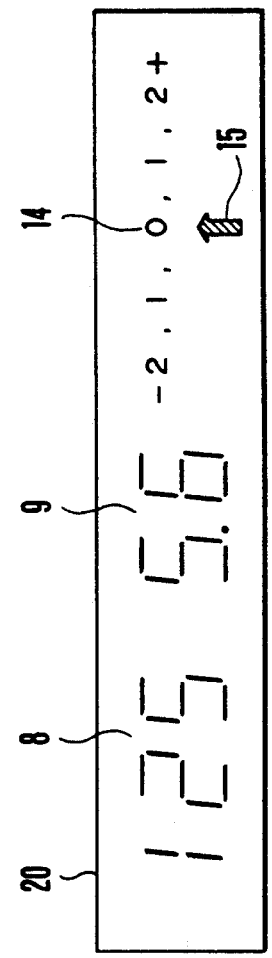
FIG. 2 is an enlarged view showing the details of a display made within the viewfinder of the same camera.
Figure 3:
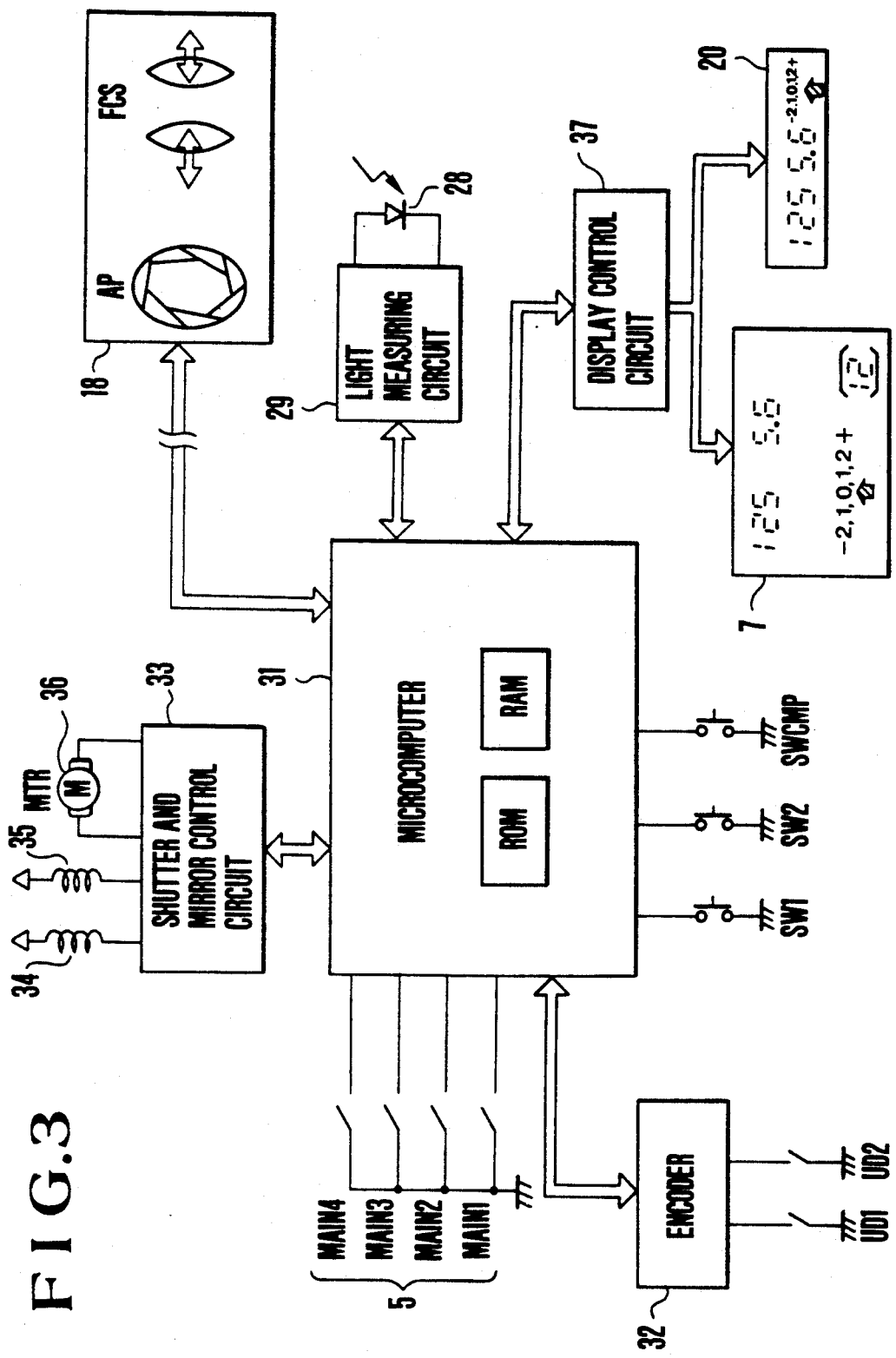
FIG. 3 is a block diagram showing in outline the arrangement of the electrical parts of the camera related to this invention.

An embodiment of this invention is described below with reference to the accompanying drawings:

FIG. 1 is a top view of a camera arranged as the embodiment of the invention. FIG. 2 is an enlarged view of a display to be made within the viewfinder of the camera. FIG. 3 shows in outline the electrical arrangement of the same camera.

Referring to FIG. 1, the camera includes a camera body 1; a shutter release button 2 which is of a two-step depressing type; an up/down dial 3 which is arranged to be turnable on a shaft extending in parallel to an optical axis 0—0 and is provided for an exposure time varying operation; an exposure compensation button 4; a main dial 5 which is provided for setting an exposure control mode; an external display device 7; a flash-device mounting accessory shoe 16 which is disposed on a projection formed for a pentagonal prism; an interchangeable lens barrel 18; and a group of electrical connection terminals 19 provided for the lens barrel 18 and the camera body 1.

Next, referring to FIG. 3 along with FIG. 1, the electrical arrangement relative to the above-stated members and the various functions of the camera are described as follows: A microcomputer 31 is arranged to control the operation of the whole camera and to perform exposure computing operation, etc. The microcomputer 31 includes memories such as a ROM, a RAM, etc.

An incremental type rotary encoder 32 is arranged to operate in association with the above-stated up/down dial 3. A control circuit 33 is provided for control over a shutter and a mirror. A magnet 34 is provided for a leading shutter curtain. A magnet 35 is provided for a trailing shutter curtain. A motor 36 is provided for moving the mirror up and down. A reference numeral 29 denotes a light measuring circuit. A numeral 28 denotes a light measuring element. A display control circuit 37 is arranged to control the external display device 7 and a liquid crystal display device 20 which is disposed within the viewfinder of the camera.

Referring further to FIG. 3, a switch SW1 is arranged to turn on in response to the first step of a depressing operation performed on the shutter release button 2. A switch SW2 is arranged to turn on in response to the second step of the depressing operation on the shutter release button 2.

The up/down dial 3 is provided with two sliding contacts UD1 and UD2. The contacts UD1 and UD2 are turnable relative to an encoder substrate (not shown) and is arranged to slide over the encoder substrate. The sliding degree of the sliding contacts is arranged to be detected as a digital electric signal. The incremental rotary encoder 32 is formed in a known manner jointly by the sliding contacts UD1 and UD2 and the encoder substrate. The up/down dial 3 is arranged, in the following manner: When the dial 3 is operated by turning it round, for example, to a one-click degree to the right, a shutter time setting value TV changes by 0.5 step for a higher shutter speed. The setting value TV changes by 0.5 step for a lower shutter speed when the dial 3 is turned round to the left to the one-click degree.

A switch SWCMP is arranged to be responsive to the exposure compensation button 4 and to close when the latter is pushed. An exposure compensating action can be carried out by rotating the up/down dial 3 while pushing the exposure compensation button 4.

Four switches MAIN1 to MAIN4 are provided for the main dial 5. The dial 5 is rotatable on a shaft which is arranged perpendicularly to the paper surface of FIG. 1. On the surface of the dial 5, there are provided exposure mode marks of varied kinds as shown in FIG. 1. A desired exposure mode can be set by rotating the main dial 5 in such a way as to adjust one of the exposure mode marks to an index 6 which is marked on the upper surface of the camera. In the case of this embodiment, an ISO film sensitivity value setting mark "ISO" is provided on the main dial 5 in addition to the exposure mode marks. These marks are provided in two groups which are separated from each other by a mark "LOCK" and arranged as follows:

The first group of marks consists of marks "PROGRAM", "TV", "AV", "M", etc., which are exposure modes (or, so to speak, a creative mode group) suited to people who are accustomed to a certain degree to operate cameras or who wish to use a high-level photograph taking technique. The mark "ISO" is disposed at the end of the first mark group. An exposure can be set on the basis of a desired film sensitivity (ISO) value by turning the up/down dial 3 with the main dial 5 turned round to adjust the mark "ISO" to the index 6. The second mark group consists of three marks including "SPORT", "PORTRAIT" and "AUTO" which denote exposure modes suited to such people who are unaccustomed to operating cameras or who do not know much about cameras (camera beginners).

The switch group including four switches MAIN1 to MAIN4 are arranged to generate, according to the rotating position of the main dial 5, a 4-bit digital signal which is defined to make their positions not overlap each other. The digital signal thus obtained is supplied to the microcomputer 31 to inform the microcomputer 31 of the exposure mode selected. The microcomputer 31 then controls the shutter, the diaphragm, etc. according to the information thus supplied.

Referring further to FIG. 3, an electrically operated diaphragm device AP and a lens driving device FCS are disposed within the lens barrel 18.

As shown in FIG. 1, the external display device 7 has an image plane consisting of an area for displaying a shutter time value 8 or an ISO film sensitivity value; an area for displaying an aperture value 9; an area for displaying a film count value 13; and parts which are arranged to show square brackets 12, an exposure compensation scale 14, an arrow 15 indicating an exposure compensation value and so forth.

Further, referring to FIG. 2, the display device 20 which is disposed within the viewfinder is also arranged to display the shutter time value 8, the aperture value 9, the arrow 15 indicating an exposure compensation value, the exposure compensation scale 14, etc.

It should be noted that each of displays made by the display devices 7 and 20 as shown in FIGS. 1 and 2 is an example of display to be made when all the information is assumed to be indicated, and does not correspond to the set state of the main dial 5 shown in FIG. 1.

Figure 4A:
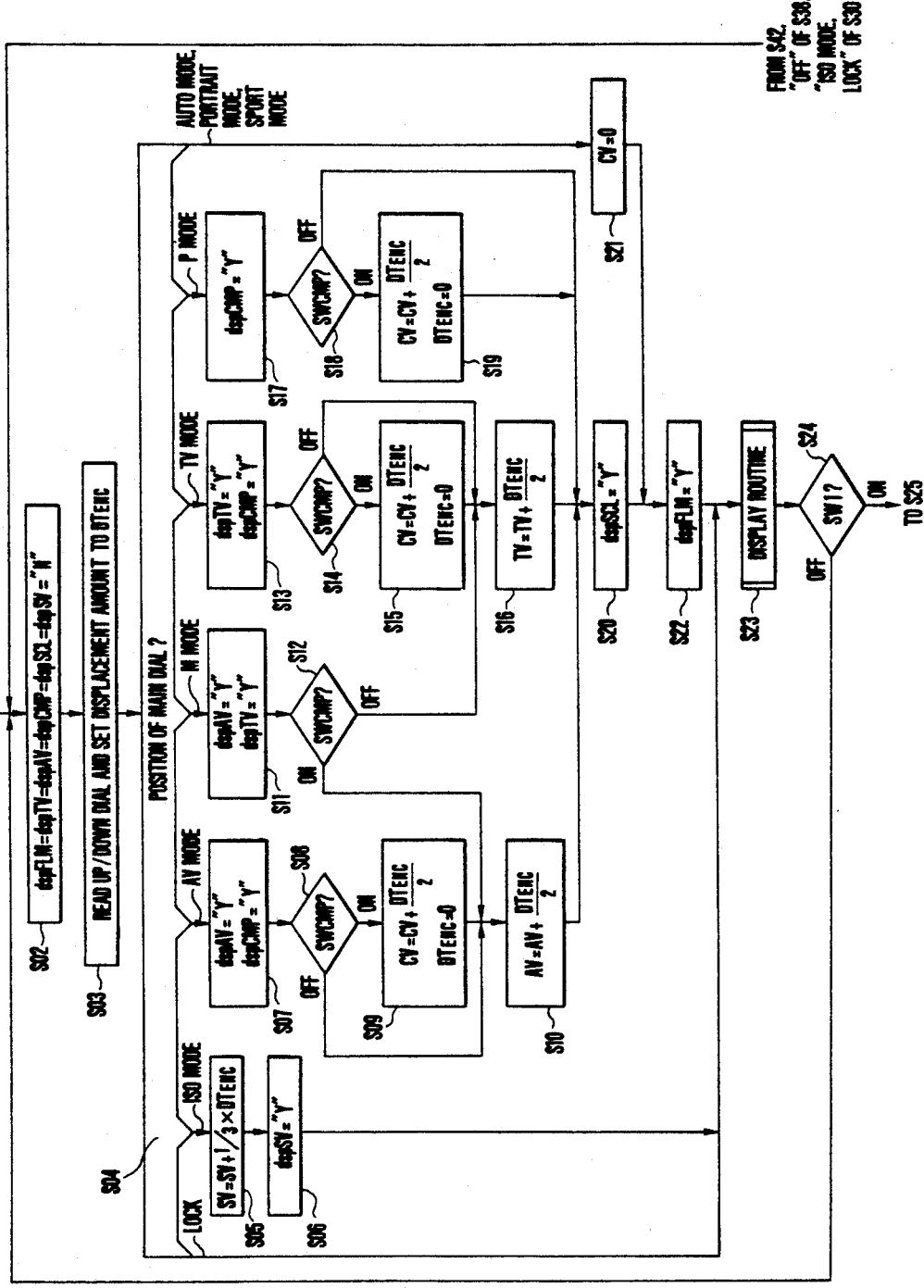
FIGS. 4(a), 4(b) and 4(c) are flow charts showing control actions to be carried out by the electrical arrangement of FIG. 3.
Figure 4B:
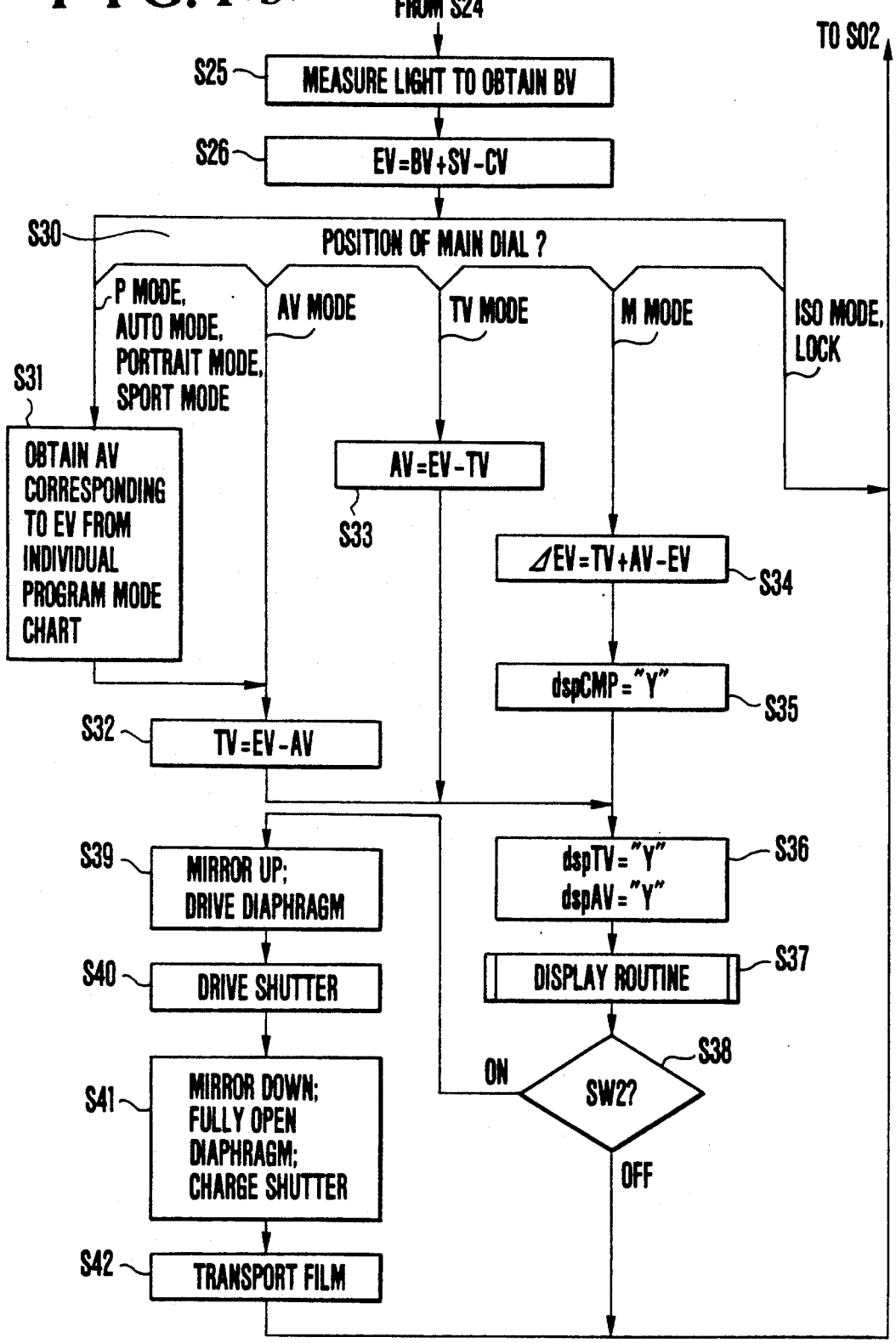
Figure 4C:
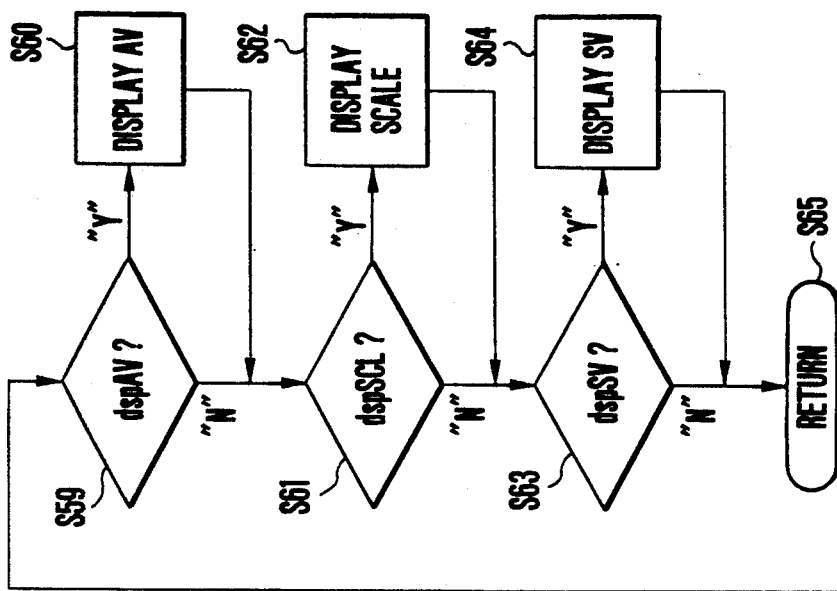
Figure 4C:
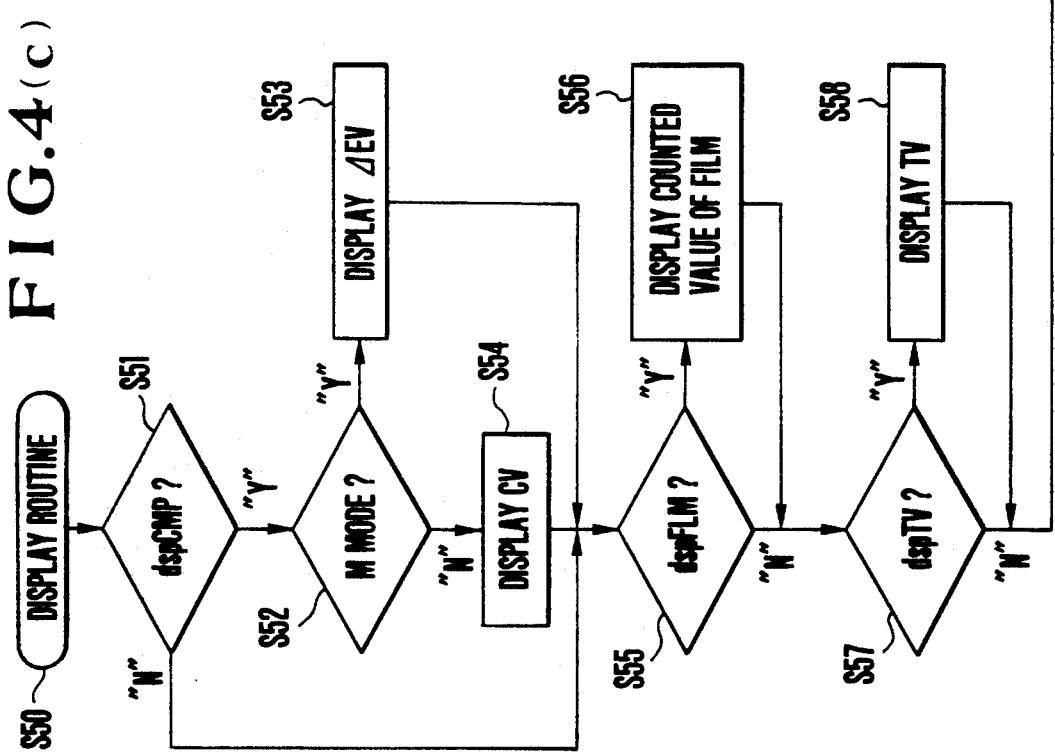

FIGS. 4(a), 4(b) and 4(c) are flow charts showing programs to be executed by the microcomputer 31. FIG. 5(a) is a table showing the results of exposure mode setting operations performed on the main dial 5 as in relation to the film count value (13) FLM, the shutter time value (8) TV, the aperture value (9) AV, the exposure compensation scale (14) SCL and the exposure-compensation-value indicating arrow (15) CMP, which are arranged to be displayed on the external display device 7 and the viewfinder display device 20 as indicated by marks "o", or not displayed as indicated by marks "x", with the switch SW1 turned on or turned off.

FIGS. 5(b) to 5(h) show various display states obtained on the image plane of the external display device 7 according to each of the exposure modes of the varied kinds set by means of the main dial 5.

The operation of the camera of this embodiment is described below with reference to FIGS. 4(a), 4(b) and 4(c) as well as FIGS. 1, 3 and 5(a) to 5(h):

Before the description of the operation with reference to FIGS. 4(a), 4(b) and 4(c), flags indicated in FIGS. 4(a) to 4(c) which are flow charts are described in details as follows:

A) Flag dspFLM: A flag which indicates whether the film count value 13 is to be displayed or not.
B) Flag dspTV: A flag which indicates whether the shutter time value 8 is to be displayed or not.
C) Flag dspAV: A flag which indicates whether the aperture value 9 is to be displayed or not.
D) Flag dspSCL: A flag which indicates whether the exposure compensation scale 14 is to be displayed or not.
E) Flag dspCMP: A flag which indicates whether the arrow 15 showing the exposure compensation value is to be displayed or not.
F) Flag dspSV: A flag which indicates whether the ISO film sensitivity value is to be displayed or not.

Next, the operation of the camera of this embodiment is described below with reference to FIGS. 4(a) to 4(c) and 5(a) to 5(h):

Referring to FIGS. 4(a) to 4(c), the microcomputer 31 assumes a standby state at a step S01. At a step S02: Data "N" (NO) is substituted in each memory disposed within the microcomputer 31. As a result, all the flags dspFLM, dspTV, dspAV, dspCMP, dspSCL and dspSV are set at "N". Under this condition, the flow of operation proceeds to a step S03.

At the step S03: The displacement amount $DT_{ENC}$ of the up/down dial 3 is read out and the flow proceeds to a step S04. At the step S04: A check is made for the position of the main dial 5. If the position of the main dial 5 indicates the ISO (film sensitivity) mode, the flow proceeds to a step S05. If the position indicates the AV (aperture priority) mode, the flow comes to a step S07. If it is the M (manual) mode, the flow comes to a step S11. If it is the TV (shutter-time priority) mode, the flow comes to a step S13. If it is the P (program) mode, the flow comes to a step S17. Further, if the main dial 5 indicates the AUTO mode, the portrait mode or the sport mode which belongs to the second group mode, the flow comes to a step S21. If the main dial 5 is set at the position "LOCK", the flow comes to a step S23.

(i) In a case where the ISO mode is selected: An ISO (film sensitivity) value SV is changed by ⅓ step at the step S05. At a step S06: The flag dspSV is set at "Y" (YES). The flow then comes to a step S23 to have the ISO value which is thus obtained displayed by both the display device 7 and the display device 20 which is disposed within the viewfinder.

(ii) In a case where the AV mode is selected: After the flags dspAV and dspCMP are set at "Y" at the step S07, the flow proceeds to a step S08. At the step S08: A check is made to find if the switch SWCMP (the switch of the exposure compensation button 4) is in a pushed state or not. If so, the flow comes to a step S09. If not, the flow comes to a step S10. At the step S09: The exposure compensation value CV is changed by ⅓ step every time the up/down dial 3 turns round to a one-click degree. At the step S10: The aperture value AV is changed by ⅓ step at a time.

(iii) In a case where the M mode is selected: The flags dspAV and dspTV are set at "Y" at the step S11, and the flow proceeds to a step S12. At the step S12: A check is made to find if the switch SWCMP (the switch of the exposure compensation button 4) is in an on-state. If so, the flow proceeds to the step S10. If not, the flow comes to a step S16. At the step S16: The shutter time value TV is changed by ⅓ step at a time.

(iv) In a case where the TV mode is selected: The flags dspTV and dspCMP are set at "Y" at the step S13. At a step S14: A check is made for the state of the switch SWCMP. If the switch SWCMP is found to be in an on-state, the flow comes to a step S15. If the switch SWCMP is found to be in an off-state, the flow comes to a step S16. At the step S15: The exposure compensation value CV is changed by ⅓ step every time the up/down dial 3 turns round to the degree of one step.

(v) In a case where the P mode is selected: The flag dspCMP is set at "Y" at the step S17. The flow then comes to a step S18. At the step S18: A check is made to find if the exposure compensation button 4 is in a pushed state (if the switch SWCMP is on). If so, the flow comes to a step S19. If not, the flow comes to a step S20. At the step S19: The exposure compensation value CV is changed by ⅓ step every time the up/down dial 3 turns round by the one-step degree. At the step S20: The flag dspSCL is set at "Y" (to cause the exposure compensation scale 14 to be displayed by the external display device 7 and the display device 20 disposed within the viewfinder). The flow then comes to a step S22. At the step S22: The flag dspFLM is set at "Y" (to cause the film count value 13 to be displayed). The flow then comes to the step S23.

(vi) In a case where the AUTO mode, the portrait mode or the sport mode is selected: The exposure compensation value CV is set at "0" at the step S21 and the flow comes to a step S22. Therefore, in this instance, the aperture value 9, the shutter time value 8, the exposure compensation scale 14 and the arrow 15 are not displayed.

A program which corresponds to the exposure mode selected at the main dial 5 thus comes to an end. After completion of the program, a display routine which is shown in FIG. 4(c) is executed as follows:

Display Routine

Step S51: The flag dspCMP is checked. If the flag dspCMP indicates "Y", the flow comes to a step S52. If the flag dspCMP indicates "N", the flow comes to a step S55.

Step S52: A check is made to find if the M mode is selected by the main dial 5. If so, the flow comes to a step S53. If not, the flow comes to a step S54.

Step S53 A degree of deviation ΔEV from an apposite exposure is displayed with the arrow 15, and the flow comes to the step S55.

Step S54: The exposure compensation value CV is displayed with the arrow 15, and the flow then comes to the step S55.

Step S55 The flag dspFLM is checked. If the flag dspFLM indicates "Y", the flow comes to a step S56. If the flag dspFLM indicates "N", the flow comes to a step S57.

Step S56: The film count value 13 is displayed. The brackets 12 are lit up. The flow then comes to a step S57.

Step S57: The flag dspTV is checked (for the necessity or non-necessity of a shutter time display). If the flag dspTV indicates "Y", the flow comes to a step S58. If the flag dspTV indicates "N", the flow comes to a step S59.

Step S58: The shutter time value TV (8) is displayed by the external display device 7 and the display device 20 which is disposed within the viewfinder.

Step S59: The flag dspAV is checked (for a display of the aperture value 9). If the flag dspAV indicates "Y", the flow comes to a step S60. If the flag dspAV indicates "N", the flow comes to a step S61.

Step S60: The aperture value AV (9) is displayed by the external display device 7 and the display device 20 disposed within the viewfinder.

Step S61: The flag dspSCL is checked (for a display of the exposure compensation scale 14). If the flag dspSCL indicates "Y", the flow comes to a step S62. If the flag dspSCL indicates "N", the flow comes to a step S63.

Step S62: The exposure compensation scale 14 is displayed by the external display device 7 and the display device 20 of the viewfinder.

Step S63: The flag dspSV is checked (for a display of the ISO film sensitivity value). If the flag dspSV indicates "Y", the flow comes to a step S64. If the flag dspSV indicates "N", the flow comes to a step S65.

Step S64: The ISO (film sensitivity) value 17 is displayed by the external display device 7 and the viewfinder display device 20, as shown in FIG. 5(b).

The display routine of the step S23 thus comes to an end, and the flow proceeds to a next step S24.

Step S24: A check is made to find if the switch SW1 which is interlocked with the shutter release button 2 is in a pushed state (on). If so, the flow comes to a step S25. If not (off), the flow returns to a step S02.

Step S25: The light measuring circuit 29 is caused to measure light to obtain a measured light value BV. The flow then proceeds to a step S26. Step S26: An exposure value EV is computed. The flow comes to a step S30. Step S30: A check is made to find which of the exposure modes is selected by the main dial 5.

After this step, the flow branches, according to the exposure mode selected by the main dial 5, as follows:

(a) In a case where the P mode, the AUTO mode, the portrait mode or the sport mode is selected: The flow proceeds to a steps S31, S32 and S36 one after another. At the step S31: An aperture value AV corresponding to the exposure value EV is obtained from one of program mode charts previously set for every one of the modes. Step S32: A shutter time value TV is computed.

(b) In a case where the AV mode is selected: The flow comes to the step S32 to obtain the shutter time value TV. The flow then comes to the step S36.

(c) In a case where the TV mode is selected: The flow comes to a step S33 to obtain the aperture value AV. The flow then comes to the step S36.

(d) In a case where the M mode is selected: The flow comes to steps S34, S35 and S36 one after another. At the step S34, a degree of deviation ΔEV from an apposite exposure is obtained. At the step S35, the flag dspCMP is set at "Y".

(e) In a case where the main dial 5 is set at the ISO mode position or the LOCK position: The flow comes back to the step S02.

All the above-stated branch flows (a) to (d) eventually join at the step S36. After that, the microcomputer 31 executes further steps up to a step S42.

Step S36: Both the flags dspTV and dspAV are set at "Y". Step S37: The display routine (the steps S50 to S65) is executed in the manner which has already been described in the foregoing and is, therefore, omitted from description here. Step S38: The switch SW2 which is interlocked with the shutter release button 2 is checked for its state. The flow proceeds to a step S39 if the switch SW2 is found to be in an on-state or comes back to the step S02 if the switch SW2 is in an off-state. Step S39: The control circuit 33 (FIG. 3) is instructed to move the mirror up (to move the mirror to a photo-taking retracted position). At the same time, an electrically operated diaphragm device AP which is disposed within the lens barrel 18 is rendered operative and caused to drive the diaphragm. Step S40: The control circuit 33 is caused to drive the shutter by exciting the magnet 34 for the leading shutter curtain and the magnet 35 for the trailing shutter curtain at an interval corresponding to a predetermined shutter time value. Step S41: The control circuit 33 is caused to drive a motor 36 to move the mirror down (to move the mirror to a viewfinder viewing position). At the same time, the diaphragm device AP disposed within the lens barrel 18 is driven to fully open the diaphragm, and a charging operation of the shutter is performed by the action of the motor 36. Step S42: The control circuit 33 is caused to perform a film winding action by driving the motor 36.

The foregoing described all the actions of the camera of this embodiment.

As described, the camera according to the arrangement of this invention is provided with an exposure mode selection (setting) member which has not only the functions suited for skilled and semi-skilled camera operators but also the functions suited for beginner camera operators. The camera is, therefore, easily operable even by the beginners. Further, the embodiment is arranged to have the information on the selected exposure mode displayed not only by the external display device but also on the image plane of the viewfinder. This arrangement enables the camera operator to carry on a photo-taking operation without parting his or her eye from the viewfinder for the purpose of confirming the information on the selected exposure mode. A further advantage of the embodiment lies in that the exposure compensation scale is arranged not to be displayed by the external display device by the viewfinder display device when the above-stated second exposure mode is selected. That arrangement enables the beginners or unskilled camera operators to carry on a photo-taking operation without being bothered by information not necessary for them. In other words, the invention provides a camera which has highly advanced functions and yet is easy to operate by all people from beginners to highly skilled camera operators.

What is claimed is:

1. A camera comprising:
   a) exposure control means arranged to permit exposure control in a first exposure control mode and in a second exposure control mode;
   b) a selection member being movable and arranged to permit selection of either said first exposure control mode or said second exposure control mode on the basis of each position to which said selection member is moved;
   c) display means arranged to change over contents of a display according to a moving position of said selection member, said display means being arranged to display an exposure control value when said first exposure control mode is selected and not to display said exposure control value when said second exposure control mode is selected;

wherein said selection member is a rotary dial having marks attached thereto indicating various modes respectively, and wherein each of said modes is selectable by rotating said dial to adjust the position of a specific mark to an index, so that a selected mode is discernible by a photographer; and wherein a third mark which indicates information irrelative to exposure control is arranged between a first mark which indicates said first exposure control mode and a second mark which indicates said second exposure control mode.

2. A camera according to claim 1, wherein said first exposure control mode is an aperture priority mode or a shutter time priority mode, and said second exposure control mode is a mode in which both an aperture value and a shutter time value are automatically determined and an exposure value thus obtained cannot be compensated.

3. A camera according to claim 1, wherein said display means includes an external display and an intra-viewfinder display, and wherein said exposure control value is arranged to be displayed on both said external display and said intra-viewfinder display when said first exposure control mode is selected and to be not displayed on either of said external display and said intra-viewfinder display when said second exposure control mode is selected.

4. A camera according to claim 2, wherein said display means includes an external display and an intra-viewfinder display, and wherein said exposure control value is arranged to be displayed on both said external display and said intra-viewfinder display when said first exposure control mode is selected and to be not displayed on either of said external display and said intra-viewfinder display when said second exposure control mode is selected.

5. A camera according to claim 4, wherein said display means includes at least an external display, mode group is selected.

6. A camera comprising:
a) exposure control means arranged to permit exposure control in each mode included in a first exposure control mode group and in each mode included in a second exposure control mode group;
b) a selection member being movable and arranged to permit selection of either each mode included in said first exposure control mode group or each mode included in said second exposure control mode group;
c) display means arranged to change over contents of a display according to a moving position of said selection member, said display means being arranged to display an exposure control value when each mode included in said first exposure control mode group is selected and not to display said exposure control value when each mode included in said second exposure control mode group is selected;

wherein said selection member is a rotary dial having marks attached thereto indicating various modes respectively, and wherein each of said modes is selectable by rotating said dial to adjust the position of a specific mark to an index, so that a selected mode is discernible by a photographer; and wherein a third mark which indicates information irrelative to exposure control is arranged between a first group of marks which indicate said first exposure control mode group and a second group of marks which indicate said second exposure control mode group.

7. A camera according to claim 6, wherein said first exposure control mode group includes an aperture priority mode or a shutter time priority mode, and said second exposure control mode group includes a mode in which both an aperture value and a shutter time value are automatically determined and an exposure value thus obtained cannot be compensated.

8. A camera according to claim 6, wherein said first exposure control mode group is a group of modes in which an exposure value is shiftable by a photographer, and said second exposure control mode group is a group of modes in which an exposure value is not shiftable by a photographer.

9. A camera according to claim 6, wherein said display means includes an external display and an intra-viewfinder display, and wherein said exposure control value is arranged to be displayed on both said external display and said intra-viewfinder display when each mode included in said first exposure control mode group is selected and to be not displayed on either of said external display and said intra-viewfinder display when each mode included in said second exposure control mode is selected.

10. A camera according to claim 6, wherein said display means includes an eternal display and an intra-viewfinder display, and wherein said exposure control value is arranged to be displayed on both said external display and said intra-viewfinder display when each mode included in said first exposure control mode group is selected and to be not displayed on either of said external display and said intra-viewfinder display when each mode included in said second exposure control mode is selected.

11. A camera according to claim 6, wherein said display means includes at least an external display, and wherein said external display and said selection member are separately arranged on both sides of a protruding part which is formed to protrude for a pentagonal prism.

12. A camera comprising:
a) exposure control means arranged to permit exposure control in a first exposure control mode and in a second exposure control mode;
b) a selection member being movable and arranged to permit selection of either said first exposure control mode or said second exposure control mode on the basis of each position to which said selection member is moved; and
c) display means arranged to change over contents of a display according to a moving position of said selection member, said display means being arranged to display exposure compensation information when said first exposure control mode is selected and not to display said exposure compensation information when said second exposure control mode is selected.

13. A camera according to claim 12, wherein marks indicating various modes are attached to said selection member, and wherein each of said modes is arranged to be selectable by adjusting the position of a specific one of said marks to an index, so that a selected mode is discernible by a photographer.

14. A camera according to claim 12, wherein said selection member is a rotary dial having marks attached thereto indicating various modes respectively, and wherein each of said modes is selectable by rotating said dial to adjust the position of a specific mark to an index, so that a selected mode is discernible by a photographer.

15. A camera according to claim 14, wherein a third mark which indicates information irrelative to exposure control is arranged between a first mark which indicates said first exposure control mode and a second mark which indicates said second exposure control mode.

16. A camera according to claim 12, wherein said first exposure control mode is an aperture priority mode or a shutter time priority mode, and said second exposure control mode is a mode in which both an aperture value and a shutter time value are automatically determined and an exposure value thus obtained cannot be compensated.

17. A camera according to claim 12, wherein said display means includes an external display and an intra-viewfinder display, and wherein said exposure compensation information is arranged to be displayed on both said external display and said intra-viewfinder display when said first exposure control mode is selected and to be not displayed on either of said external display and said intra-viewfinder display when said second exposure control mode is selected.

18. A camera according to claim 13, wherein said display means includes an external display and an intra-viewfinder display, and wherein said exposure compensation information is arranged to be displayed on both said external display and said intra-viewfinder display when said first exposure control mode is selected and to be not displayed on either of said external display and said intra-viewfinder display when said second exposure control mode is selected.

19. A camera according to claim 14, wherein said display means includes an external display and an intra-viewfinder display, and wherein said exposure compensation information is arranged to be displayed on both said external display and said intra-viewfinder display when said first exposure control mode is selected and to be not displayed on either of said external display and said intra-viewfinder display when said second exposure control mode is selected.

20. A camera according to claim 16, wherein said display means includes an external display and an intra-viewfinder display, and wherein said exposure compensation information is arranged to be displayed on both said external display and said intra-viewfinder display when said first exposure control mode is selected and to be not displayed on either of said external display and said intra-viewfinder display when said second exposure control mode is selected.

21. A camera according to claim 12, wherein said display means includes at least an external display, and wherein said external display and said selection member are separately arranged on both sides of a protruding part which is formed to protrude for a pentagonal prism.

22. A camera according to claim 14, wherein said display means includes at least an external display, and wherein said external display and said selection member are separately arranged on both sides of a protruding part which is formed to protrude for a pentagonal prism.

23. A camera comprising:
a) exposure control means arranged to permit exposure control in each mode included in a first exposure control mode group and in each mode included in a second exposure control mode group;
b) a selection member being movable and arranged to permit selection of either each mode included in said first exposure control mode group or each mode included in said second exposure control mode group; and
c) display means arranged to change over contents of a display according to a moving position of said selection member, said display means being arranged to display exposure compensation information when each mode included in said first exposure control mode group is selected and not to display said exposure compensation information when each mode included in said second exposure control mode group is selected.

24. A camera according to claim 23, wherein marks indicating various modes are attached to said selection member, and wherein each of said modes is arranged to be selectable by adjusting the position of a specific one of said marks to an index, so that a selected mode is discernible by a photographer.

25. A camera according to claim 23, wherein said selection member is a rotary dial having marks attached thereto indicating various modes respectively, and wherein each of said modes is selectable by rotating said dial to adjust the position of a specific mark to an index, so that a selected mode is discernible by a photographer.

26. A camera according to claim 25, wherein a third mark which indicates information irrelative to exposure control is arranged between a first group of marks which indicate said first exposure control mode group and a second group of marks which indicate said second exposure control mode group.

27. A camera according to claim 23, wherein said first exposure control mode group includes an aperture priority mode or a shutter time priority mode, and said second exposure control mode group includes a mode in which both an aperture value and a shutter time value are automatically determined and an exposure value thus obtained cannot be compensated.

28. A camera according to claim 23, wherein said first exposure control mode group is a group of modes in which an exposure value is shiftable by a photographer, and said second exposure control mode group is a group of modes in which an exposure value is not shiftable by a photographer.

29. A camera according to claim 23, wherein said display means includes an external display and an intra-viewfinder display, and wherein said exposure compensation information is arranged to be displayed on both said external display and said intra-viewfinder display when each mode included in said first exposure control mode group is selected and to be not displayed on either of said external display and said intra-viewfinder display when each mode included in said second exposure control modes is selected.

30. A camera according to claim 23, wherein said display means includes an external display and an intra-viewfinder display, and wherein said exposure compensation information is arranged to be displayed on both said external display and said intra-viewfinder display when each mode included in said first exposure control mode group is selected and to be not displayed on either of said external display and said intra-viewfinder display when each mode included in said second exposure control modes is selected.

31. A camera according to claim 25, wherein said display, means includes an external display and an intra-viewfinder display, and wherein said exposure compensation information is arranged to be displayed on both said external display and said intra-viewfinder display when each mode included in said first exposure control mode group is selected and to be not displayed on either of said external display and said intra-viewfinder display when each mode included in said second exposure control modes is selected.

32. A camera according to claim 26, wherein said display means includes an external display and an intra-viewfinder display, and wherein said exposure compensation information is arranged to be displayed on both said external display and said intra-viewfinder display when each mode included in said first exposure control mode group is selected and to be not displayed on either of said external display and said intra-viewfinder display when each mode included in said second exposure control modes is selected.

33. A camera according to claim 23, wherein said display means includes at least an external display, and wherein said external display and said selection member are separately arranged on both sides of a protruding part which is formed to protrude for a pentagonal prism.

34. A camera according to claim 12, wherein said exposure compensation information includes an exposure compensation scale.

35. A camera according to claim 23, wherein said exposure compensation information includes an exposure compensation scale.

* * * * *

UNITED STATES PATENT AND TRADEMARK OFFICE
CERTIFICATE OF CORRECTION

PATENT NO. : 5,210,569   Page 1 of 3
DATED : May 11, 1993
INVENTOR(S) : YOSHIHIKO HARADA It is certified that error appears in the above-indentified patent and that said Letters Patent is hereby corrected as shown below:

ON THE TITLE PAGE:
[75] Inventor
    "Yoshihito Harada, Kanagawa, Japan" should read
--Yoshihito Harada, Yokohano, Japan--.

COLUMN 1
    Line 16, "only" should read --only by--.
    Line 19, "do not" should be deleted.
    Line 22, "is desired to be" should be deleted.
    Line 34, "do not" should be deleted.

COLUMN 2
    Line 25, "does not" should be deleted.
    Line 26, "know" should read --knows--.
    Line 63, "drawings:" should read --drawings.--.

COLUMN 4
    Line 6, "follows: should read --follows.--.
    Line 47, "of" should read --of the--.

COLUMN 5
    Line 3, "5(h):" should read --5(h).--.
    Line 24, "5(h):" should read --5(h).--.
    Line 60, close up right margin.
    Line 61, close up left margin.

UNITED STATES PATENT AND TRADEMARK OFFICE
CERTIFICATE OF CORRECTION

PATENT NO. : 5,210,569
DATED : May 11, 1993
INVENTOR(S) : YOSHIHIKO HARADA

It is certified that error appears in the above-indentified patent and that said Letters Patent is hereby corrected as shown below:

<u>COLUMN 6</u>
    Line 41, "follows:" should read --follows.--.
    Line 51, "Step S53" should read --Step S53:--.
    Line 57, "Step S55" should read --Step S55:--.

<u>COLUMN 7</u>
    Line 42, "a" should be deleted.

<u>COLUMN 8</u>
    Line 42, "device" should read --device or--.

UNITED STATES PATENT AND TRADEMARK OFFICE
CERTIFICATE OF CORRECTION

PATENT NO. : 5,210,569
DATED : May 11, 1993
INVENTOR(S) : YOSHIHIKO HARADA

It is certified that error appears in the above-indentified patent and that said Letters Patent is hereby corrected as shown below:

<u>COLUMN 9</u>
   Line 37, "claim 4," should read --claim 1,--.
   Line 38, "display, mode" should read --display, and wherein said external display and said selection member are separately arranged on both sides of a protruding part which is formed to protrude for a pentagonal prism--.
   Line 39, line 39 should be deleted.

Signed and Sealed this

Twenty-ninth Day of March, 1994

BRUCE LEHMAN

*Attest:*

*Attesting Officer*          Commissioner of Patents and Trademarks